United States Patent
Kalinin

(10) Patent No.: US 8,082,800 B2
(45) Date of Patent: *Dec. 27, 2011

(54) SAW TORQUE AND TEMPERATURE SENSOR WITH IMPROVED TEMPERATURE SENSITIVITY

(75) Inventor: Victor Alexandrovich Kalinin, Oxfordshire (GB)

(73) Assignee: Transence Technologies Plc, Oxfordshire (GB)

(*) Notice: Subject to any disclaimer, the term of this patent is extended or adjusted under 35 U.S.C. 154(b) by 0 days.

This patent is subject to a terminal disclaimer.

(21) Appl. No.: 12/755,007

(22) Filed: Apr. 6, 2010

(65) Prior Publication Data
US 2010/0186513 A1 Jul. 29, 2010

Related U.S. Application Data

(63) Continuation of application No. PCT/GB2008/000983, filed on Mar. 19, 2008.

(30) Foreign Application Priority Data

Jun. 15, 2007 (GB) .................................. 0711765.8

(51) Int. Cl.
*G01N 29/04* (2006.01)

(52) U.S. Cl. .......................................... 73/801; 73/760

(58) Field of Classification Search .................... 73/801, 73/862.08, 760
See application file for complete search history.

(56) References Cited

U.S. PATENT DOCUMENTS

| 7,165,455 | B2 * | 1/2007 | Magee et al. | 73/650 |
| 7,795,779 | B2 * | 9/2010 | Kalinin | 310/313 R |
| 2003/0000309 | A1 | 1/2003 | Lonsdale et al. | |
| 2009/0314104 | A1 * | 12/2009 | Lohr et al. | 73/862.338 |

FOREIGN PATENT DOCUMENTS

GB 2426336 11/2006

* cited by examiner

*Primary Examiner* — Max Noori
(74) *Attorney, Agent, or Firm* — Keusey & Associates, P.C.

(57) ABSTRACT

A contactless SAW based torque and temperature sensor comprising a first (2) and second (3) SAW resonator provided on a substrate made of Y+34° cut of quartz. The first SAW resonator (2) has its principle axis inclined at +45° to the X-axis of the substrate, which, in use is either aligned with the longitudinal axis of the device who torque is to be measured or is perpendicular thereto, and the second SAW (3) has its principle axis inclined at −45° to the X-axis of the substrate. A third SAW (4) has its principle axis inclined at an angle of 30 degrees to the X-axis of the substrate. Each said SAW resonator (2,3,4) is formed by laying a film of aluminum on the substrate having a thickness (h) and the SAW resonators have an average operating wavelength λ where the ratio h/λ is in the range 0.021 to 0.032.

12 Claims, 2 Drawing Sheets

SAW TORQUE AND TEMPERATURE SENSOR WITH IMPROVED TEMPERATURE SENSITIVITY

CROSS-REFERENCE TO RELATED APPLICATION

This application is a Continuation of International Application PCT/GB2008/000983 filed on Mar. 19, 2008 which claims priority from GB Application 0711765.8 filed on Jun. 15, 2007.

BACKGROUND OF THE INVENTION

1. Field of the Invention

The present invention relates to improvements in the temperature sensitivity of SAW based sensors for measuring both torque and temperature.

2. The Prior Art

Applicant's own earlier British Patent Application no. 2426336 discloses a contactless SAW based torque and temperature sensor comprising a first and a second SAW resonator provided on a substrate made of Y+34° cut of quartz. The first SAW has its principle axis inclined at +45° to the X-axis of the substrate, which, in use, is either aligned with the longitudinal axis of the device whose torque is to be measured or is perpendicular thereto, and the second SAW has its principle axis inclined at −45° to the X-axis of the substrate. A third SAW is also present having its principle axis inclined at an angle to the principle axis of both the first and second resonators.

In the first and the third embodiments shown in FIGS. 1 and 6 of GB 2426336, the SAW resonators for torque measurement M1SAW and M2SAW are positioned on the same substrate as the resonator TSAW (or resonators T1SAW and T2SAW) used for temperature measurement. The substrate is made of Y+34° cut quartz, and the angle between the SAW propagation direction for TSAW (T1SAW and T2SAW) and the X axis of the substrate α is close to 30° in order to maximize sensitivity of the frequency difference $F_t$ to temperature ($F_t$ is specified in T0060, for the first embodiment it equals the difference between the resonant frequencies of M2SAW and TSAW).

The pattern of the SAW resonators on the quartz substrate is usually made of a thin aluminum film. GB 2426336 is silent on the thickness h of the Al film and the variation of the frequency difference $F_t$ with temperature presented in FIG. 3 of GB 2426336 is theoretically calculated for h=0. It corresponded to the average temperature sensitivity of approximately 9 kHz/° C.

In reality the Al film thickness has a finite value, with fabricated SAW Sensors, which have been publicly available, having an approximate Al film thickness of h=260 nm and resonant frequencies of M1SAW, M2SAW and TSAW equal to 437 MHz, 435 MHz and 433 MHz respectively.

Since the Al electrodes and reflecting strips modified properties of the quartz substrate surface, the actual temperature sensitivity of $F_t$ in the prior art system turned out to be only 2.4 kHz/° C. that is considerably smaller than the theoretically predicted value of 9 kHz/° C.

SUMMARY OF THE INVENTION

According to the present invention there is provided a contactless SAW based torque and temperature sensor comprising a first and a second SAW resonator provided on a substrate made of Y+34° cut of quartz (or close to it in terms of the rotation angle), said first resonator having the SAW propagation direction inclined at +45° to the X-axis of the substrate, which, in use, is either aligned with the longitudinal axis of the device whose torque is to be measured or is perpendicular thereto, and said second resonator having the SAW propagation direction inclined at −45° to the X-axis of the substrate, and further comprising a third SAW resonator having the SAW propagation direction inclined at an angle to the X-axis of the substrate which is substantially equal to 30°, wherein each said SAW resonator is formed by laying a film of aluminum on the substrate having a thickness (h) and the SAW resonators have an average operating wavelength λ where h/λ is in the range 0.021 to 0.032.

A sensor in accordance with the invention has the advantage that the temperature sensitivity is significantly improved as compared with the prior art.

For sensors working in the 430 MHz range, the Aluminum thickness is then preferably in the range of 160 nm to 240 nm. The resonators operate at the frequency range from 428 MHz to 437 MHz. In general, the Al thickness is less than 240 nm. The device whose torque is to be measured may be a drive train component, for example an axle or flexplate.

The calculation of the h/λ ratio normalizes the parameter so as to apply to any sensor operating frequency, λ being the average SAW wavelength for M1SAW, M2SAW and TSAW. The approximate range of the normalized Al thickness h/λ of 0.021 to 0.032 is to provide a linear temperature characteristic of $F_t$ up to +150° C. with the average sensitivity close to 10 ppm/° C. (relative to the TSAW resonant frequency) and the $Q \geq 10000$.

In an advantageous development, the sensor includes a fourth SAW resonator which is inclined at an equal but opposite angle to the angle of inclination of the third SAW, the fourth SAW resonator being formed of aluminum film having the same thickness as said third SAW resonator. The third and fourth SAW resonators are particularly advantageously arranged symmetrically relative to the X axis of the substrate. Both the third and fourth SAWs are then used to provide temperature information. Preferably, the third and fourth SAWs are inclined at +α° and −α° respectively to the X axis of the substrate and are provided on a common substrate which may be formed separately from the substrate carrying the first and second SAW resonators but is preferably integrally formed therewith.

BRIEF DESCRIPTION OF THE DRAWING

In order that the invention may be well understood, there will now be described some embodiments thereof, given by way of example, reference being made to the accompanying drawings, in which.

DETAILED DESCRIPTION OF THE PREFERRED EMBODIMENT

Figure 1:
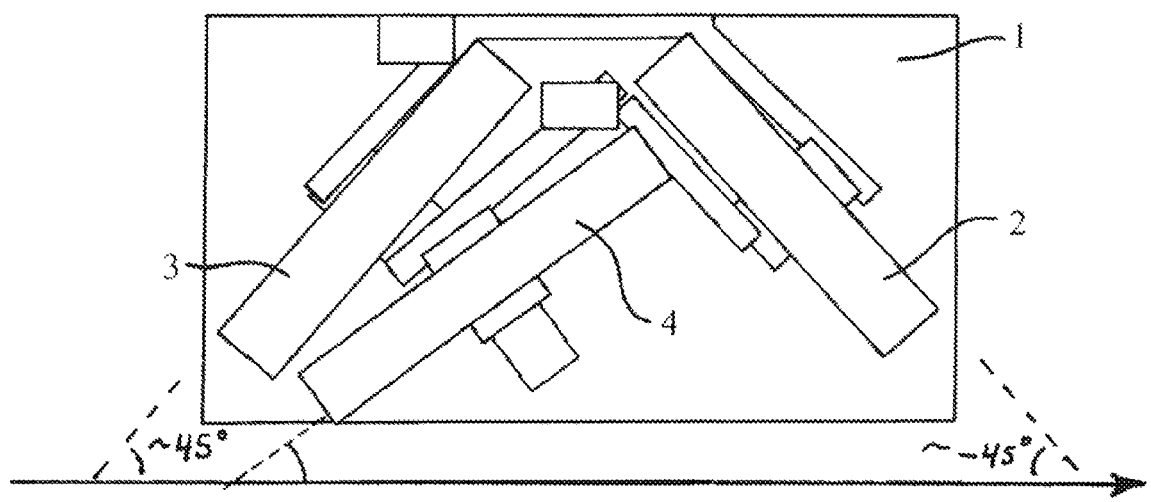
FIG. 1 is a schematic diagram of a first torque and temperature sensor to which the present invention applies.

Referring first to FIG. 1, there is shown a diagrammatic illustration of a sensor of the type to which the present invention is applicable. The sensor comprises a substrate 1 is made of Y+34° cut quartz on which are formed a first SAW resonator M1SAW (2) and a second SAW resonator M2SAW (3), the resonators being made at such an angle to X axis of the substrate that the acoustic waves propagate at +45° and −45° to the X axis respectively, that is the principle axes of the two SAWs are inclined at +45° and −45° to the X axis respectively (the principal axis of the resonator is defined as the direction of the phase velocity of the SAW propagating in the resonator). In FIG. 1, the angle of M2SAW (3) is shown as substantially 45°, that is ~45°. The angle of M1SAW (2) is shown as substantially −45°, that is ~−45°. The −45° angle may also be characterized as a +135° angle. This provides minimum variation of their resonant frequencies $f_2$ and $f_1$ with temperature T, maximum sensitivity of $F_M=f_1-f_2$ to torque M and small variation of this sensitivity with temperature. A third resonator TSAW (4) is fabricated on the same substrate at such an angle to the X axis that the SAW in that resonator propagates at an angle to the X axis of substantially 30 degrees. All three resonators are electrically connected either in series or in parallel by means of either conducting tracks on the substrate or by bond wires. As an example, resonant frequencies can be selected as follows: for M1SAW $f_1$=437 MHz, for M2SAW $f_2$=435 MHz and for TSAW $f_3$=433 MHz.

If the cut angle of the quartz substrate differs slightly from 34° then the SAW propagation directions in M1SAW and M2SAW can also be slightly different from ±45° in order to minimize variation of the resonant frequencies of M1SAW and M2SAW with temperature.

Each SAW resonator is formed by laying a film of Aluminum onto the substrate in order to form strips constituting the fingers of the SAW device. It has been discovered that the temperature characteristic of $F_t$ at zero torque varies with the Al film thickness as shown in FIG. 3.

As can be seen from FIG. 3, reducing the Al film thickness below 260 nm significantly improves linearity and increases sensitivity of the frequency difference $F_t$ to temperature. This allows more accurate temperature measurement and hence betters temperature compensation of the torque reading within the entire temperature range from −40° to +125° C. accepted in automotive industry as a standard.

Quite often the required temperature range for torque measurement is extended up to +150° C. If h=335 nm then an unambiguous temperature measurement can only be performed up to approximately +70° C. If h=263 nm then the curve of $F_t$ versus temperature becomes rather nonlinear at T>+130° and the accuracy of temperature measurement decreases. However, if h=200 nm the temperature characteristic of $F_t$ stays linear up to +150° C. and the sensitivity is twice as high as the one at h=260 nm.

Figure 3:
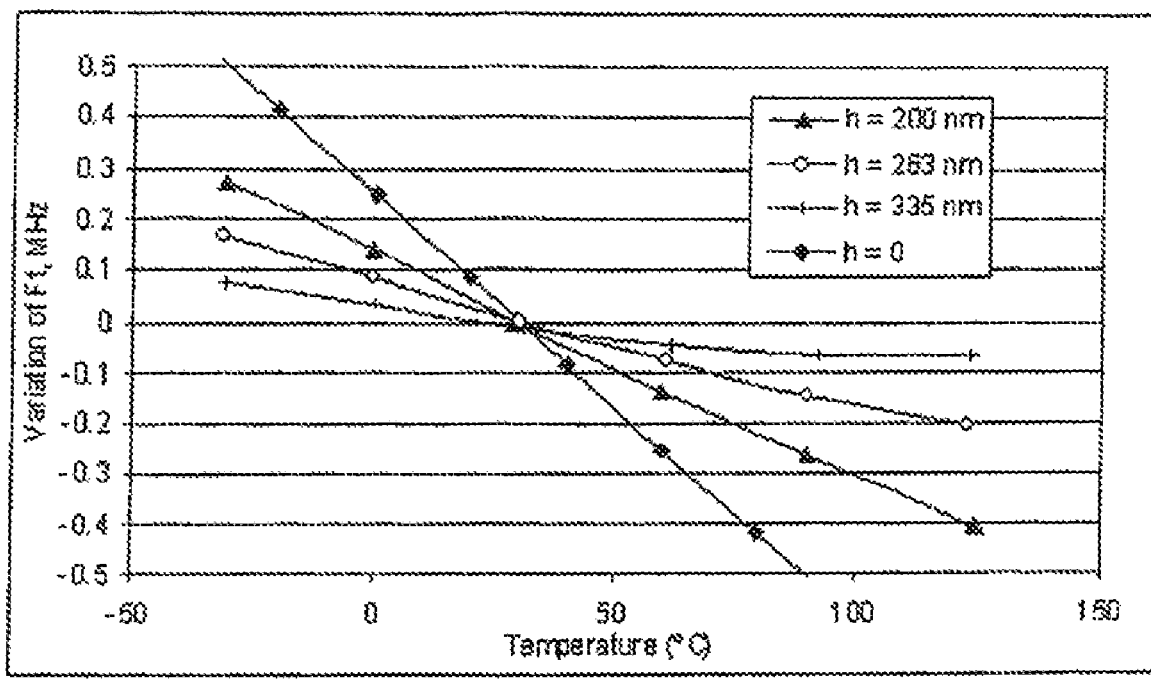
FIG. 3 is variation of frequency difference between M2SAW and TSAW with temperature at different aluminum thicknesses (h).

FIG. 3 might suggest that h should be minimized in order to further increase the temperature sensitivity of $F_t$. However, reduction of the Al film thickness well below 200 nm has been found to reduce SAW reflection from the Al strips and hence reduces the Q factor of the resonators. To a certain extent this reduction can be compensated by increasing the number of reflecting strips in the gratings. However, the area of the quartz substrate is usually limited in order to minimize the cost of the sensor. Reduction of the Al film thickness below 160 nm will noticeably affect the Q factor of the resonators working at 430 MHz range for a fixed substrate area of 4×6 mm.

Accordingly, a thickness range of 160 nm to 240 nm optimizes the sensitivity.

The substrate 1, in use, is attached to the surface of a shaft or the like whose torque is to be measured, this torque giving rise to a biaxial strain field as opposed to the uniaxial strain field developed in pressure monitoring applications, which biaxial strain field (principal components of strain are tension and compression strain along ±45° to the X axis of the substrate) is transmitted to the substrate so that all three resonators are strained.

In the embodiment of FIG. 1, all three SAWs are mounted on a common substrate. However, it will be understood that this is not essential, and they could instead be mounted on separate substrates as taught in the above referenced prior art.

Figure 2:
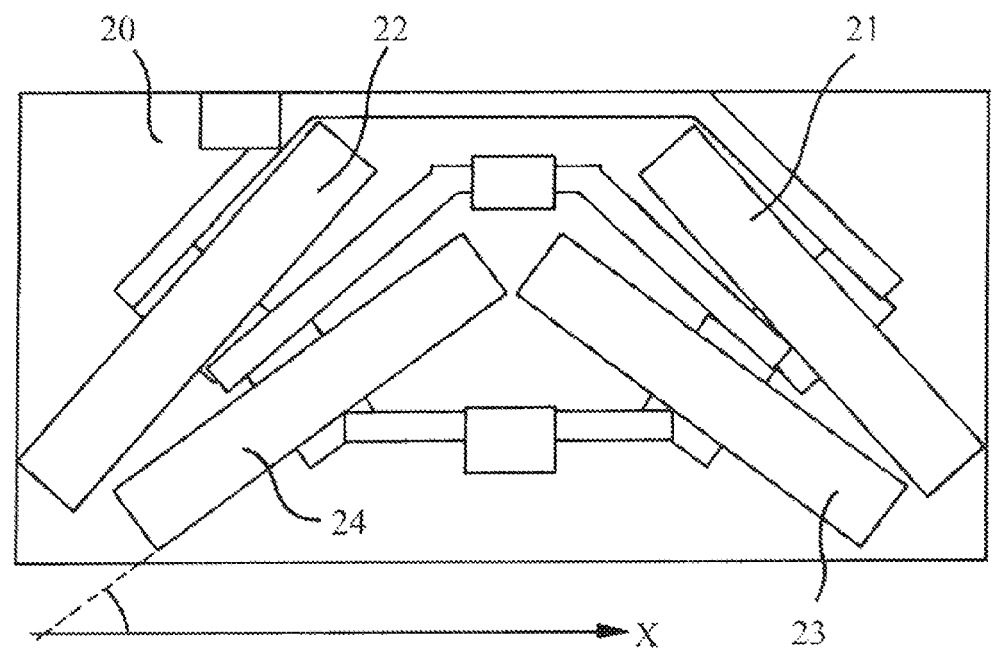
FIG. 2 is a schematic diagram of a second torque and temperature sensor to which the present invention applies.

The sensor of FIG. 2 shows an alternative arrangement which avoids potential problems of $F_T$, being dependent on torque.

In this embodiment, the sensor made on a single Y+34° cut quartz substrate 20, but in different to the previous embodiment, in addition to two torque sensing elements M1SAW (21) and M2SAW (22) positioned at ±45° to the X axis, two temperature sensing elements T1SAW (23) and T2SAW (24), are provided positioned symmetrically relative to the X axis of the substrate at equal but opposite angles of substantially +/−30 degrees and having resonant frequencies $f_4$ and $f_3$. The first temperature element 23 has a SAW propagation direction at substantially −30 degrees to the X-axis, the second one 24 has a SAW propagation direction at substantially +30 degrees to the X-axis.

F $M=f_1-f_2$ is measured depending predominantly on torque and $F_T''=f_1+f_2-f_3-f_4$ depending only on temperature. Using measured value of $F_T''$ one can easily calculate temperature. Furthermore, $F_M'=f_3-f_4$ can be measured that will depend predominantly on torque although with a smaller torque sensitivity. As a result torque can also be calculated from the value $F_M'$ giving us a redundancy that increases reliability of torque measurements.

A disadvantage of this embodiment is an increased die area, sensor interrogation time and wider frequency range occupied by the sensor.

The present invention further provides a SAW resonator comprising a substrate having an aluminum film provided thereon of thickness to operating wavelength ratio h/λ in the range 0.021 to 0.032. More particularly, for an operating frequency range around 430 MHz, for example 428-437 MHz, the invention provides aluminum thickness of less than 260 nm, more particularly less than 240 nm and preferably in the range of 160 nm to 240 nm.

What is claimed is:

1. A contactless SAW based torque and temperature sensor comprising:
   a first and a second SAW resonator provided on a substrate made of a cut of quartz substantially in the range of Y+34°, said first SAW having its principle axis inclined at substantially +45° to the X-axis of the substrate, which, in use, is either aligned with the longitudinal axis of the device whose torque is to be measured or is perpendicular thereto, and said second SAW having its principle axis inclined at substantially −45° to the X-axis of the substrate; and
   a third SAW having its principle axis inclined at an angle to the X-axis of the substrate which is substantially equal to 30°, wherein each said SAW resonator is formed by laying a film of aluminum on the substrate having a thickness (h) and the SAWs have an average operating wavelength λ where the ratio h/λ is in the range 0.021 to 0.032.

2. The contactless SAW based torque and temperature sensor according to claim 1, wherein the resonators operate within the frequency range of about 428 MHz to about 437 MHz.

3. The contactless SAW based torque and temperature sensor according to claim 2, wherein aluminum has a thickness of less than 240 nm.

4. The contactless SAW based torque and temperature sensor according to claim 2, wherein the aluminum has a thickness in the range of 160 nm to 240 nm.

5. A contactless SAW based torque and temperature sensor comprising:
- a device whose torque is to be measured having a longitudinal axis;
- a substrate having an X-axis and made of a cut of quartz substantially in the range of Y+34°, said substrate is mounted on said device in an alignment with the longitudinal axis of said device;
- a first and a second SAW resonator provided on said substrate, said first SAW having its principle axis inclined at substantially +45° to the X-axis of the substrate, and said second SAW having its principle axis inclined at substantially −45° to the X-axis of the substrate; and
- a third SAW having its principle axis inclined at an angle to the X-axis of the substrate which is substantially equal to 30°, wherein each said SAW resonator is formed by laying a film of aluminum on the substrate having a thickness (h) and the SAWs have an average operating wavelength $\lambda$ where the ratio $h/\lambda$ is in the range 0.021 to 0.032.

6. The contactless SAW based torque and temperature sensor of claim 5, wherein said substrate is made from a Y+34° cut of quartz.

7. The contactless SAW based torque and temperature sensor of claim 5, wherein said device is a drive train component.

8. The contactless SAW based torque and temperature sensor of claim 5, wherein the X-axis of said substrate is aligned parallel with the longitudinal axis of said device.

9. The contactless SAW based torque and temperature sensor of claim 5, wherein the X-axis of said substrate is aligned perpendicular to the longitudinal axis of said device.

10. The contactless SAW based torque and temperature sensor according to claim 5, wherein the resonators operate within the frequency range of 428 MHz to 437 MHz.

11. The contactless SAW based torque and temperature sensor according to claim 5, wherein aluminum has a thickness of less than 240 nm.

12. The contactless SAW based torque and temperature sensor according to claim 5, wherein the aluminum has a thickness in the range of 160 nm to 240 nm.

* * * * *

UNITED STATES PATENT AND TRADEMARK OFFICE
CERTIFICATE OF CORRECTION

PATENT NO. : 8,082,800 B2
APPLICATION NO. : 12/755007
DATED : December 27, 2011
INVENTOR(S) : Victor Alexandrovich Kalinin Page 1 of 1

It is certified that error appears in the above-identified patent and that said Letters Patent is hereby corrected as shown below:

On the Title Page:
Item (73), Assignee: line 1, delete "Transence" and insert --Transense--.

Signed and Sealed this
Third Day of April, 2012

David J. Kappos
*Director of the United States Patent and Trademark Office*